United States Patent
Simon et al.

(12)
(10) Patent No.: US 6,848,825 B1
(45) Date of Patent: Feb. 1, 2005

(54) LASER SCANNING MICROSCOPE WITH AOTF

(75) Inventors: Ulrich Simon, Rothenstein (DE); Stefan Wilhelm, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/238,859

(22) Filed: Jan. 28, 1999

(30) Foreign Application Priority Data

Jun. 18, 1998 (DE) .......................... 198 27 140

(51) Int. Cl.[7] .................. G01K 11/22; G01N 21/27; G02B 21/00; G01B 11/00
(52) U.S. Cl. ...................... 374/141; 374/142
(58) Field of Search .................. 374/141, 42, 30, 374/32, 142; 250/342, 338.1, 347, 504 R, 339; 356/121, 400, 399, 252, 72; 33/293, DIG. 21

(56) References Cited

U.S. PATENT DOCUMENTS

| | | | | |
|---|---|---|---|---|
| 4,536,062 A | | 8/1985 | Price et al. .................. 350/358 |
| 4,787,750 A | * | 11/1988 | Nelson et al. ............... 356/437 |
| 4,940,316 A | * | 7/1990 | Brandt ........................ 350/358 |
| 5,039,855 A | * | 8/1991 | Kemeny et al. ............. 250/339 |
| 5,120,961 A | * | 6/1992 | Levin et al. ................. 250/339 |
| 5,263,037 A | * | 11/1993 | Trutna, Jr. et al. ............ 372/20 |
| 5,388,323 A | * | 2/1995 | Hopson et al. .............. 374/142 |
| 5,410,371 A | * | 4/1995 | Lambert ...................... 348/769 |
| 5,444,528 A | * | 8/1995 | Puschell ...................... 356/73 |
| 5,617,206 A | * | 4/1997 | Fay ............................ 356/320 |
| 5,841,577 A | * | 11/1998 | Wachman et al. ........... 359/386 |
| 5,969,238 A | * | 10/1999 | Fischer ........................ 73/105 |
| 5,975,757 A | * | 11/1999 | Hopson et al. .............. 374/142 |
| 6,021,237 A | * | 2/2000 | Kim et al. ..................... 385/28 |
| 2003/0107732 A1 | * | 6/2003 | Sasaki et al. ................ 356/318 |
| 2004/0105485 A1 | * | 6/2004 | Bures et al. ................. 374/142 |

FOREIGN PATENT DOCUMENTS

| | | |
|---|---|---|
| EP | 0 695 963 A1 | 7/1995 |
| EP | 0695963 A1 | 7/1995 |

* cited by examiner

*Primary Examiner*—Gail Verbitsky
(74) *Attorney, Agent, or Firm*—Reed Smith LLP

(57) ABSTRACT

A laser scanning microscope with an AOTF in the laser input-coupling beam comprises a temperature gauge provided in the environment of the AOTF or in the vicinity thereof or connected therewith. A laser scanning microscope with an AOTF in the laser input-coupling beam path comprises that the AOTF and/or its environment are/is heated or cooled.

7 Claims, 2 Drawing Sheets ized*US 6,848,825 B1*

LASER SCANNING MICROSCOPE WITH AOTF

BACKGROUND OF THE INVENTION a) Field of the Invention

The invention relates to a laser scanning microscope with AOTF.

b) Description of the Related Art

It is already known to combine lasers of different wavelengths in a laser scanning microscope by means of a beam splitter and to couple the lasers into a light-conducting fiber by means of an AOTF (acousto-optic tunable filter) with a grating which is realized by varying the refractive index and whose grating constant can be varied corresponding to its high-frequency driving. The wavelength, which is diffracted in the first order by the AOTF, and the intensity are adjusted by controlling the AOTF; the intensity is adjusted by the amplitude of the sound wave and the wavelength is adjusted by the frequency of the sound wave.

The use of acousto-optics for line selection and attenuation of laser lines in a modular construction has the disadvantage that the transmission characteristics of the acousto-optic unit is highly dependent on temperature. This can be explained by the fact that a change in temperature brings about a change in the velocity of sound in the crystal material which makes itself apparent indirectly in a deviation from the optimum frequency and accordingly in a decrease in the diffraction efficiency. A frequency shift of approximately 16 KHz/° C. was determined. This leads to intensity losses and to possible intensity modulations in the scanned image.

For example, when the AOTF was adapted to 21° C., the transmitted output drops to approximately 5% of the initial value with a change in temperature from 21° C. to 35° C. without corrective steps. Even with a change in temperature of only 4° C., an output drop of about 50% occurs.

An acceptable performance of the laser scanning microscope can only be ensured when the temperature fluctuations can be limited to +/−1° C. However, this is hardly possible in practice due to the many and various possible uses of the laser scanning microscope. Moreover, room temperatures of greater than 30° C. are quickly reached in many laboratories.

OBJECT AND SUMMARY OF THE INVENTION

Therefore, it is the primary object of the invention to ensure the stability of laser output for all required wavelengths in the ultraviolet (351 nm, 364 nm) and visible spectral ranges (450 nm–650 nm) in spite of uncertain and erratic setup conditions of the LSM (laser scanning microscope).

According to the invention, this object is met by a laser scanning microscope with an AOTF in the laser input-coupling beam comprising a temperature gauge provided in the environment of the AOTF or in the vicinity thereof or connected therewith. Also in accordance with the invention, a laser scanning microscope with an AOTF in the laser input-coupling beam path comprises that the AOTF and/or its environment are/is heated or cooled.

The AOTF frequency can advantageously be controlled by driving the AOTF by means of a driver interface depending on temperature. The temperature detection can be carried out for this purpose in the immediate vicinity of the AOTF, for example, directly at its housing.

If a temperature deviation of more than +/−1° C. from a given reference value is determined, an automatic frequency readjustment is carried out within a given frequency window, preferably +/−200 KHz, by the frequency determined at the reference value (temperature). The frequency can also be adjusted on the basis of temperature-dependent frequency values which have been recorded beforehand and stored in tables.

The temperature deviation can also be compensated by an increase in intensity which compensates for the efficiency loss of the AOTF.

In extreme cases, the LSM mentioned above realizes the unification of an Ar laser (458 nm, 488 nm, 514 nm) or ArKr laser (488 nm, 568 nm) with two HeNe lasers, respectively, on the VIS laser module. The laser lines are combined via dichroics and mirrors on a common axis and selected in an AOTF, and the first order of diffraction of the VIS (visible range) AOTF is coupled into a single-mode fiber. The selection of the laser lines 351 nm and 364 nm is effected on the UV laser module by a UV-AOTF; the first order of diffraction is likewise coupled into a single-mode fiber.

BRIEF DESCRIPTION OF THE DRAWINGS

The invention is explained more fully hereinafter with reference to the schematic drawings.

DESCRIPTION OF THE PREFERRED EMBODIMENTS

Figure 1:
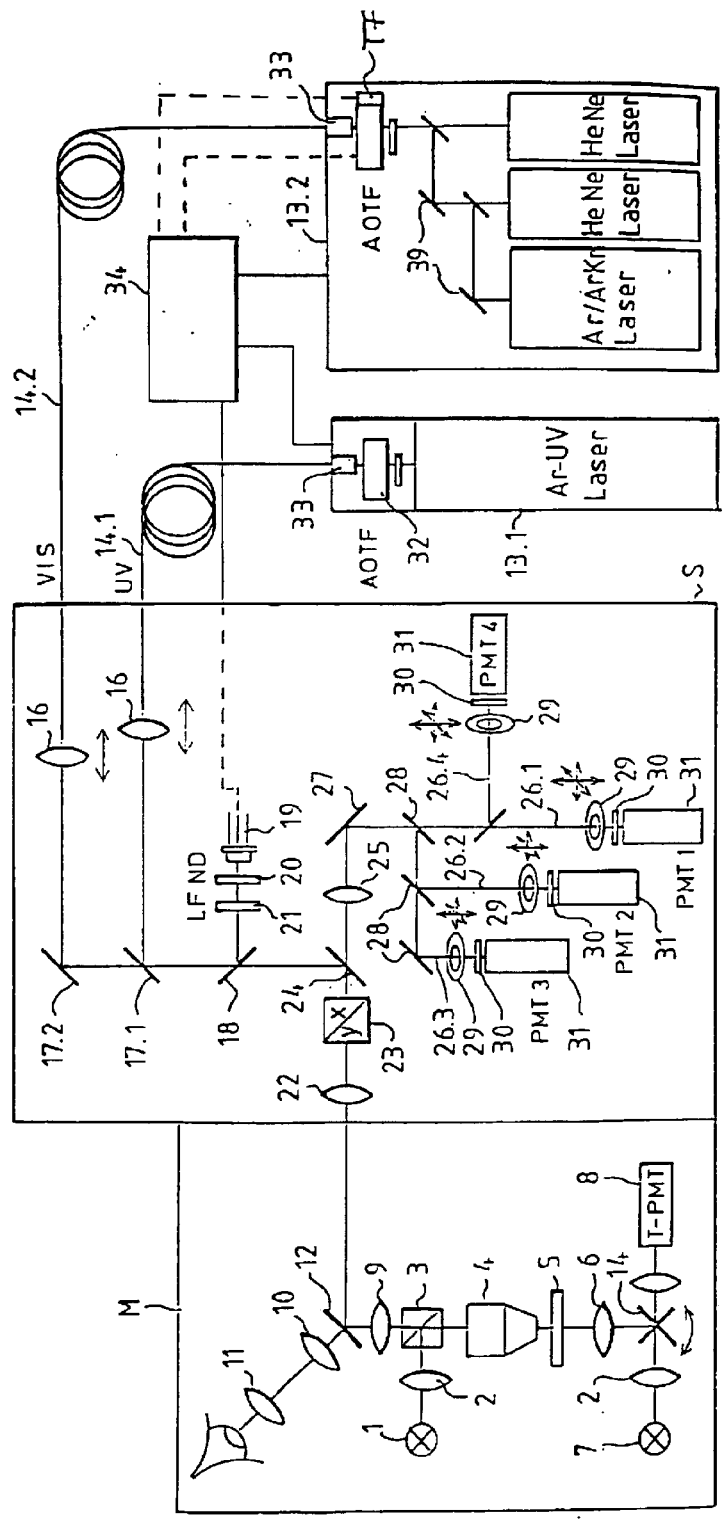
FIG. 1 shows the beam path of a laser scanning microscope.
Figure 2:
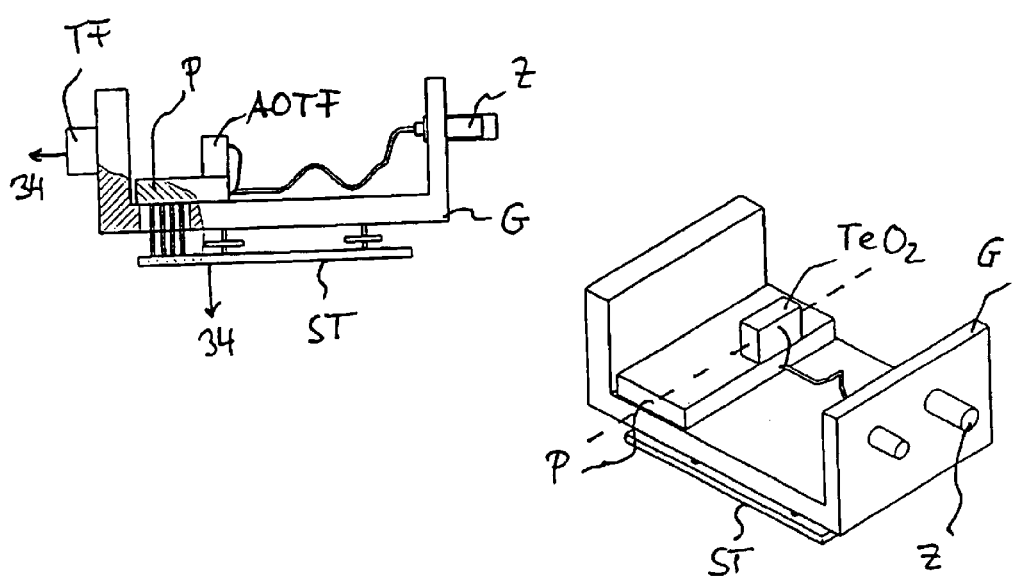
FIG. 2 shows the heatable AOTF in partial section in a side view and in a spatial view.

FIG. 1 shows schematically a microscope unit M and a scan head S which have a shared optical interface via an intermediate imaging Z according to FIG. 2.

The scan head S can be at the phototube of an upright microscope and also at a side output of an inverse microscope.

FIG. 1 shows a microscope beam path which is switchable between incident light scanning and transmitted-light scanning by means of a swivelable mirror 14 and comprising light source 1, illumination optics 2, beam splitter 3, objective 4, specimen 5, condenser 5, light source 7, receiver arrangement 8, a first tube lens 9, an observation beam path with a second tube lens 10 and eyepiece 11, and a beam splitter for coupling in the scanning beam.

A laser module 13.1, 13.2 receives the laser and is connected with the laser input-coupling unit of the scan head S via monomode light-conducting fibers 14.1, 14.2.

Coupling into the light-conducting fibers 14.1, 14.2 is carried out by means of displaceable collimating optics 16 which will be discussed more fully hereinafter, and beam deflecting elements 17.1, 17.2.

A monitoring beam path is stopped down by means of a partially transmitting mirror 18 in the direction of a monitor diode 19 in front of which line filters 21 and neutral filters 20 are advantageously on a rotatable filter wheel, not shown.

The actual scanning unit comprises a scanning objective 22, scanner 23, main beam splitter 24 and shared imaging optics 25 for detection channels 26.1–26.4.

A deflecting prism 27 behind the imaging optics 25 reflects the radiation coming from the object 5 in the direction of dichroic beam splitters 28 in the convergent beam path of the imaging optics 25 which are followed by pinholes 29 which can be adjusted in the direction of and vertical to the optical axis and varied in diameter, an individual pinhole 29 being provided for each detection channel, and by emission filters 30 and suitable receiver elements 31 (PMT).

As is shown schematically in FIG. 5, the beam splitters 27, 28 can advantageously be constructed as a splitter wheel with a plurality of positions which are switchable by means of stepper motors.

UV radiation is advantageously coupled into glass fibers 14.1, preferably a single-mode glass fiber, by means of an AOTF serving as a beam deflector, i.e., when the beam should not fall on the fiber input, it is deflected from the fiber input, for example, in the direction of a light trap, not shown, by means of the AOTF.

The input-coupling optics 33 for coupling in the laser radiation have lens systems, not shown, for the purpose of coupling in, wherein the focal length of the lens systems is determined by the beam cross section of the lasers and the numerical aperture required for optimal coupling in. Single-wavelength and multiple-wavelength lasers which are coupled into one or more fibers individually or jointly via an AOTF are provided in the laser module 13.2. Further, the coupling in can also be carried out via a plurality of fibers simultaneously, the coupled in radiation being mixed on the microscope side by color combiners after traversing adaptive optics.

It is also possible to mix the radiation of different lasers at the fiber input and this mixing can be carried out by the exchangeable and switchable splitter mirror 39 which is shown schematically.

The laser radiation exiting from the end of the fiber 14.1,2 at the scanning unit s is collimated to an infinite beam by the collimating optics 16. This is advantageously carried out by an individual lens which, by displacing it along the optical axis by means of a control unit 37 which is controllable by a central driving unit 34, has a focussing function in that its distance from the end of the light-conducting fiber 14.1,2 at the scanning unit can be changed according to the invention. The monitor diode 19 which can also have a preset focussing lens, not shown in the drawing, acts in conjunction with a line-selective or region-selective filter wheel or filter slide 21 controlled by a control unit (not shown) for continuous monitoring of the laser radiation coupled into the scan module, especially in order to monitor the output in a determined laser line in isolation and, if need be, to stabilize it via the AOTF 32 by means of a regulating signal of the driving unit 34.

The detection by means of the monitor diode 19 detects the laser noise and variations due to mechanical-optical systems.

An error signal can be derived from the detected instantaneous laser output, wherein the error signal is fed back on-line to the laser directly or to an intensity modulator (AOM, AOTF, EOM, (electro-optical modulator) shutter) following the laser for the purpose of stabilizing the laser output radiated into the scan module. In this way, a wavelength stabilization of the intensity and laser output monitoring can be carried out by driving the filter unit 21.

Through a connection to the detection unit 31 (PMT) and, respectively, to the central driving unit, a noise reduction can be carried out by division and/or subtraction of the detection signal and monitoring signal of the diode 19 in that the corresponding sensor signal of a detection channel is standardized (e.g., division) by pixel to the signal of the monitoring diode as pixel image information in order to reduce intensity fluctuations in the image in this way.

A temperature gauge TF which detects the ambient temperature of the respective AOTF is attached directly to the AOTF. This ambient temperature is supplied to the driving unit 34 containing a computer which, based on previously stored correction curves and a RS 232 driver circuit, adjusts and optimizes the AOTF frequency depending on the temperature in a given frequency window; that is, it compensates for the frequency shift occurring as a result of the temperature deviation by increasing or decreasing frequency. However, this compensation can also be carried out automatically based on the intensity value of the laser radiation picked up by the diode 19 and supplied to the driving unit in that the diode 19 is connected with the evaluating unit and the AOTF driver readjusts the frequency based on the recorded intensity signal of the diode 19 by varying the frequency preferably by +/−200 KHz until a maximum signal is reached.

A further advantageous solution consists in providing the AOTF with separate heating or cooling.

In a particularly advantageous manner, the crystal is heated to a range of greater than 35° C., for example, 40° C., and is maintained constant within a given window.

The laser output in the first order of diffraction then remains constant within close boundaries over the entire temperature range of, for example, 15° C. to 35° C. An example of a stable temperature regulation whose regulation fluctuations do not exhibit any negative effects for the laser scanning microscope is shown in FIG. 2.

The TeO2 crystal of the AOTF is arranged on a housing part G having lines Z to the voltage supply of the AOTF, wherein the traversing laser radiation is indicated schematically.

Located between the housing G and the TeO2 crystal is a plate P which can be heated or cooled electrically and whose voltage supply ST can be arranged on the outside of the housing as is shown by way of example.

The current supply ST is connected with a regulating unit which is connected with a temperature gauge that can be arranged directly at the TeO2 crystal or at the current supply ST.

The regulating unit can be part of the current supply ST or regulation can be carried out by means of the driving unit 34.

The temperature gauge TF can also be arranged at the housing, as was already shown in FIG. 1, and connected with the evaluating unit 34 which detects the temperature change and drives the AOTF in a corresponding manner.

While the foregoing description and drawings represent the preferred embodiments of the present invention, it will be obvious to those skilled in the art that various changes and modifications may be made therein without departing from the true spirit and scope of the present invention.

What is claimed is:

1. In a laser scanning microscope with an AOTF (acousto-optic tunable filter) in the laser input-coupling beam path, an improvement comprising:

a temperature gauge being provided in one of the environment of the AOTF and the vicinity thereof and connected therewith;

means for one of cooling and heating at least one of the AOTF and its environment; and wherein said means for one of heating and cooling includes regulation of said at least one of the AOTF and its environment to a constant temperature value and wherein said AOTF is driven by an optimized AOTF frequency to provide a constant laser output in the first order of diffraction.

2. The laser scanning microscope according to claim 1, wherein heating is carried out to a value above expected laboratory conditions.

3. The laser scanning microscope according to claim 2, wherein the value is above 35 degrees Centigrade.

4. The laser scanning microscope according to claim 1, wherein the temperature gauge is connected to one of heating and cooling means by an electronic control for regulating the temperature.

5. The laser scanning microscope according to claim 1, wherein the temperature gauge is connected with a driving unit for the AOTF.

6. The laser scanning microscope according to claim 4, wherein said electronic control is located as part of a power supply.

7. The laser scanning microscope according to claim 4 wherein said electronic control is part of a driving unit.

* * * * *